United States Patent Office 3,686,040
Patented Aug. 22, 1972

3,686,040
HEATING SYSTEM FOR A RAILWAY TANK CAR OR THE LIKE
George M. Grover, Los Alamos, N. Mex., and Edward L. Coyle, St. Charles, Mo., assignors to ACF Industries, Incorporated, New York, N.Y.
Original application Oct. 4, 1968, Ser. No. 765,208, now Patent No. 3,554,183, dated Jan. 12, 1971. Divided and this application May 14, 1970, Ser. No. 48,729
Int. Cl. F28d 15/00
U.S. Cl. 165—105
3 Claims

ABSTRACT OF THE DISCLOSURE

A heat transfer pipe containing a vaporizable fluid and having a porous wick on its inner surface is mounted in the tank of a railway tank car and extends into a furnace outside the tank. The outer end of the pipe communicates with a reservoir for the fluid. The wick has a plurality of porous metallic layers designed to provide good heat transfer, as well as a high degree of capillary action. Evaporation of the liquid produced by the furnace and condensation along the whole length of the pipe in the tank transfer a great amount of heat into the tank at a generally uniform temperature.

This is a division of application Ser. No. 765,208, filed Oct. 4, 1968, now Patent No. 3,554,183.

BACKGROUND OF THE INVENTION

Heat transfer pipes commonly known as "heat pipes" comprise an outer enclosed shell, a porous wick, and a working fluid for wetting the wick. A portion of the heat pipe referred to as the evaporator section is heated and the working fluid in the evaporator area is vaporized and driven through the pipe. As heat is given off by the heat pipe, the vaporized fluid condenses to a liquid and is returned to the boiler area by the capillary action of the wick. Such heat pipes transport heat at efficiencies greater than ninety (90) percent and have an effective thermal conductivity several thousand times that of copper. A heat pipe is disclosed in Patent 3,229,759, and a railway car having a heat pipe is disclosed in Patent No. 3,468,300.

SUMMARY OF THE INVENTION

The present invention is directed to a railway tank car having a heat pipe mounted thereon for heating and maintaining the lading at a predetermined temperature during transit and at unloading sites. A generally straight length of the heat pipe is mounted within the tank and has an outer end portion extending outwardly of the tank into a heat producing furnace. The heat transfer pipe comprises an outer enclosed shell, a porous wick positioned against the inner surface of the shell, and a vaporizable fluid within the shell, the fluid being vaporized from the heat generated by the furnace and moving outwardly away from the furnace to condense along the length of the pipe upon the transfer of heat to the lading within the tank car. Upon condensing, the fluid is returned by the capillary action of the wick to the outer end portion of the pipe. Sufficient working fluid is put into the heat pipe to wet the entire wick and the wick is held tightly and uniformly against the inside wall of the heat pipe. The outer end of the heat pipe is connected to a reservoir adapted to contain all of the vaporizable fluid when the heat pipe is not operating. To obtain efficient heat transfer and capillary action by the wick, it is formed of a number of layers of wire mesh and permeable metal.

BRIEF DESCRIPTION OF THE DRAWING

The invention is illustrated in the accompanying drawing, in which.

DESCRIPTION OF THE PREFERRED EMBODIMENTS

Figure 1:
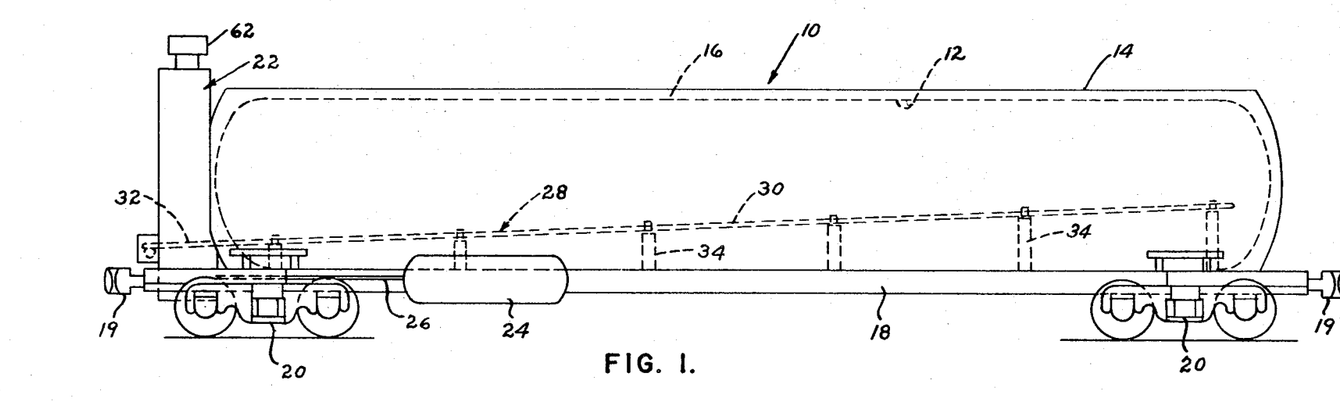
FIG. 1 is a side elevation of a railway tank car having a heat pipe in the tank and extending out of the tank into a furnace.

Referring to the drawings, an insulated railway tank car is generally indicated 10 in FIG. 1 and comprises an inner tank 12, and outer jacket 14 extending about the circumference of tank 12, and a layer of insulating material 16, such as a polyurethane foam material or fiber glass, between outer jacket 14 and inner tank 12. A center sill 18 extends the length of railway car 10, with outer jacket 14 being attached to the outer sides of center sill 18. A coupler 19 is mounted within each end of center sill 18. A wheeled truck 20 is provided adjacent each end of railway tank car 10.

Figure 2:
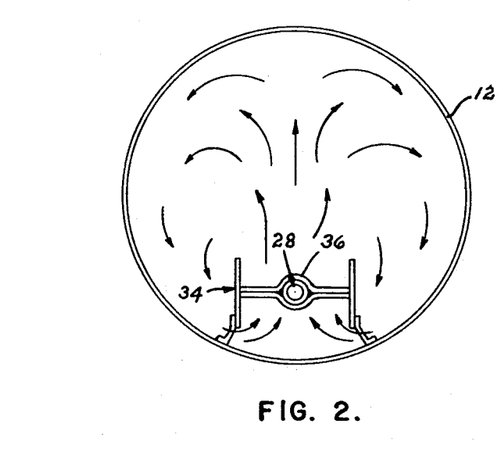
FIG. 2 is a schematic view of a baffle arrangement to provide circulation beneath the heat pipe to the bottom of the tank.
Figure 3:
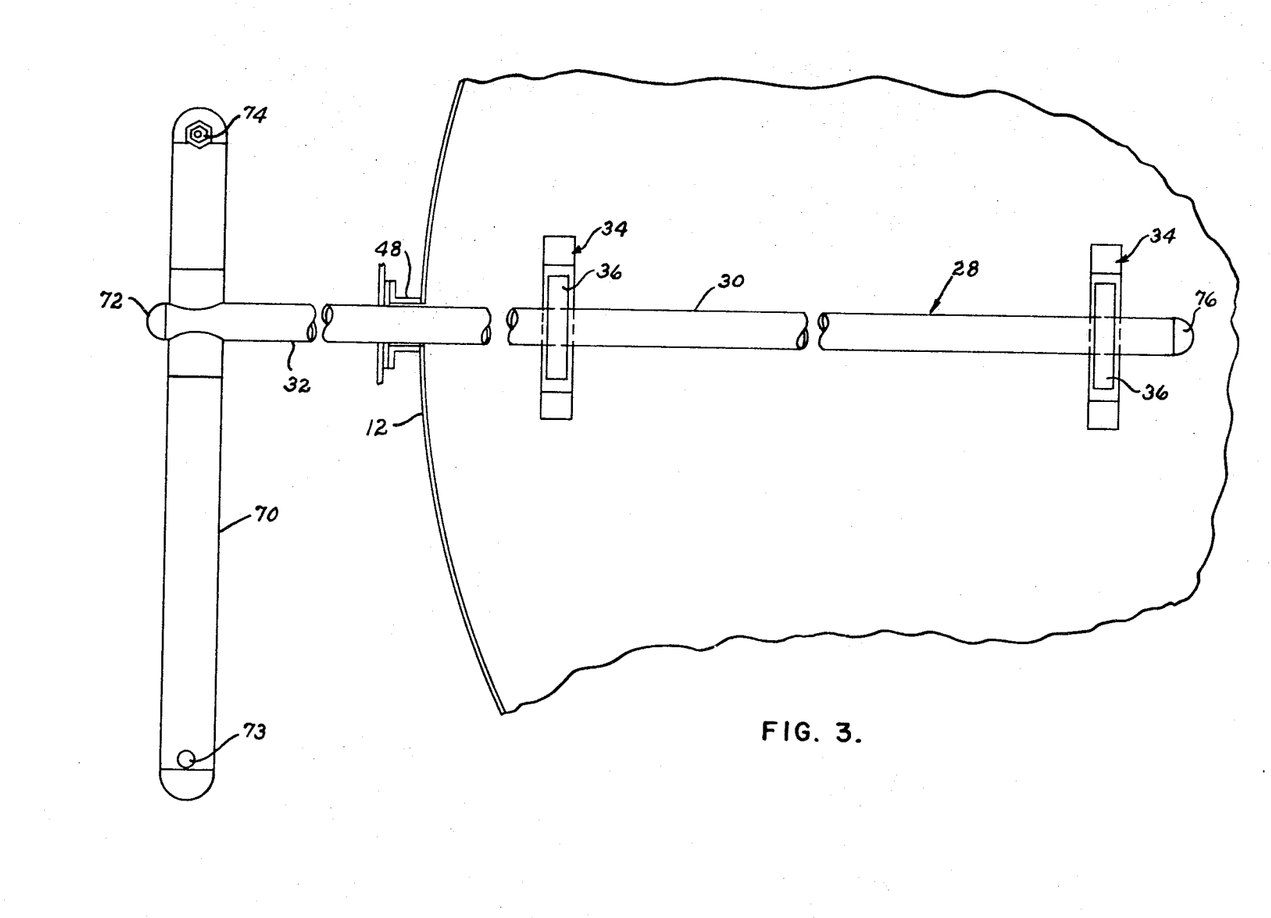
FIG. 3 is a top plan view of the heat pipe, with a portion of the tank broken away.
Figure 4:
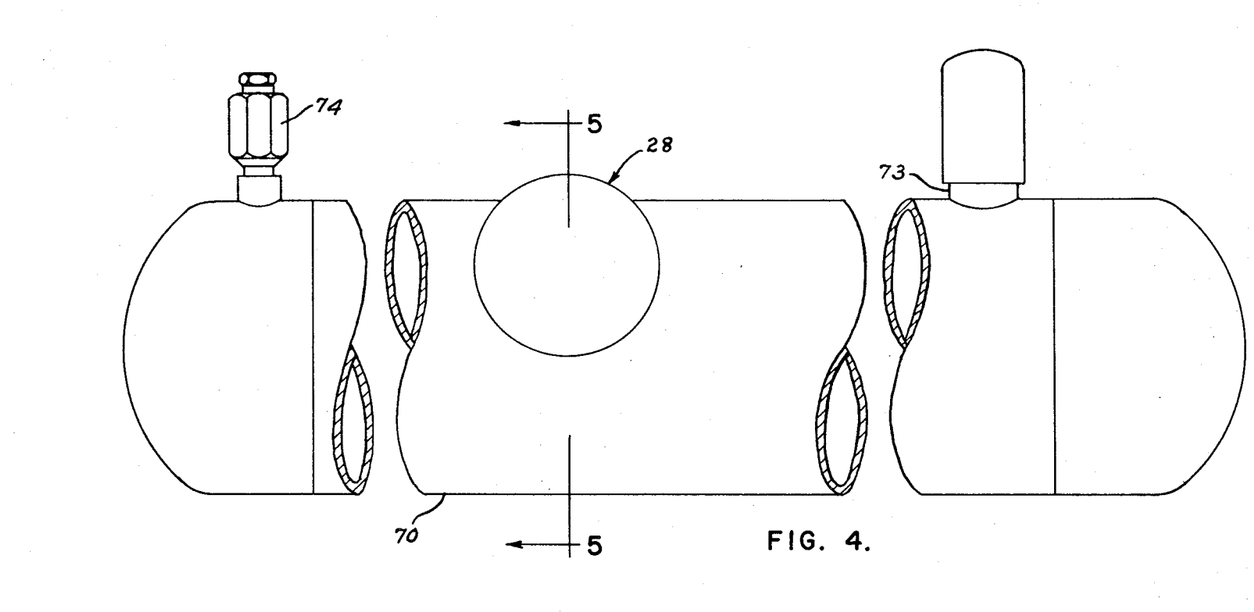
FIG. 4 is a front elevation of the heat pipe and its reservoir.

Mounted on an end of railway tank car 10 is furnace 22 of the open flame type. To supply fuel, such as propane gas, to furnace 22, a fuel container 24 is mounted on each side of railway tank car 10 and has a fuel line 26 leading to furnace 22. Mounted within inner tank 12 for heating liquid lading therein to temperatures of 500° F. or greater is a heat pipe 28 for transferring heat from furnace 22 to the lading within inner tank 12. Heat pipe 28 includes an inner portion 30 mounted within tank 12 and an outer end portion 32 which extends through the adjacent end of inner tank 12 and outer jacket 14 within furnace 22. As shown in FIG. 2, brackets generally indicated 34, have sleeves 36 receiving inner heat pipe portion 30 and lower legs secured to the inner surface of tank 12 to support heat pipe section 30 within the tank at a height above the bottom of the tank. As shown in FIG. 1, heat pipes 28 slopes downwardly to outer end portion 32 within furnace 22. As it is desirable for pipe 28 to have such a downwardly slope under all operating conditions, the slope may preferably be between two percent (2%) and four percent (4%), which is normally the maximum railway grade encountered. Thus, the slope of pipe 28 under operating conditions may vary from around zero to an eight percent (8%) slope depending on the grade of the railway track.

Figure 15:
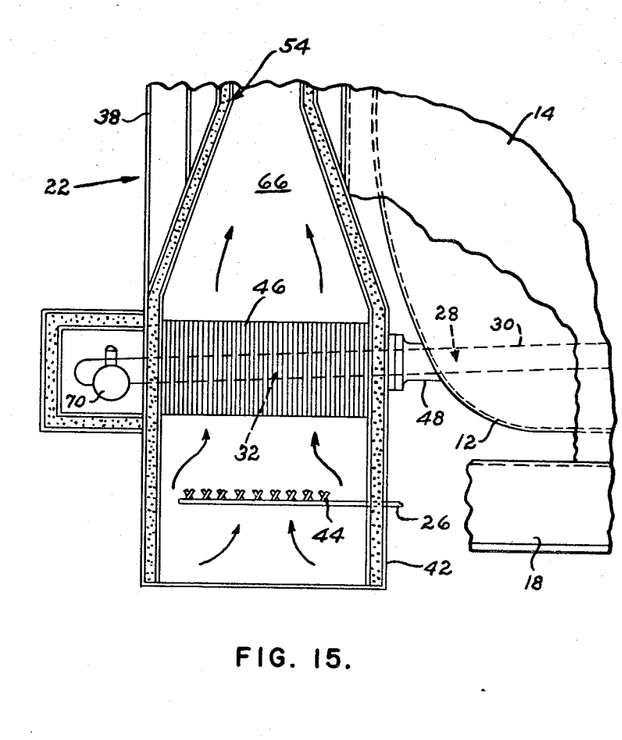
FIGS. 15 and 16 are partial views of the furnace and evaporator section of the heat pipe.
Figure 16:
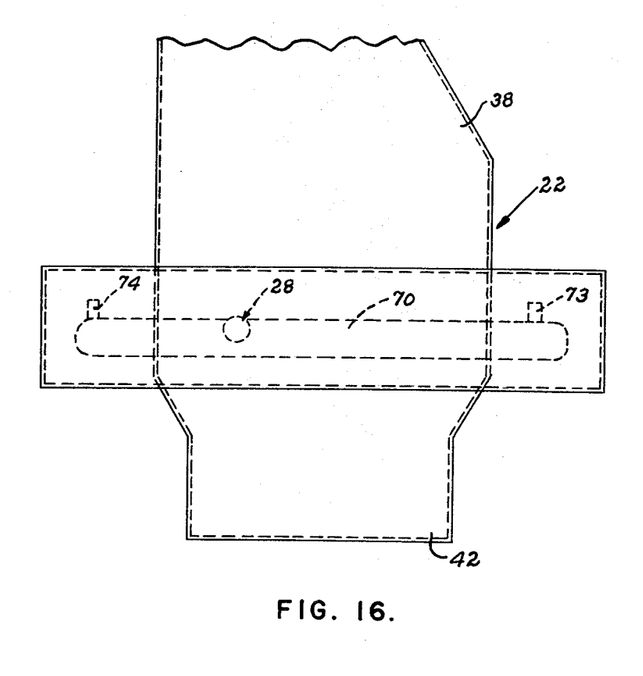

Referring now to furnace 22 and more particularly to FIGS. 15 and 16, an outer housing 38 extending downwardly to a horizontal section 42 beneath center sill 18 as shown in FIG. 15. Fuel lines 26 from fuel containers or tanks 24 lead to burner nozzles 44 suitably mounted within furnace 22. Positioned above nozzles 44 are a plurality of vanes or fins 46 secured about outer end portion 32 of heat pipe 28. A bearing 48 supports outer end portion 32 and is secured between tank 12 and furnace 22.

Extending upwardly from horizontal section 42 is an inner housing generally indicated 54 and forming an air outlet conduit. An upper cap or cover generally indicated 62 is positioned over the upper end of housing 54 to prevent foreign matter and rain from entering outlet conduit or duct formed by inner housing 54. The air and gas mixture burns below fins 46, and the heat passes upwardly through the spaced fins 46 to heat pipe section 32. Fins 46 are at a temperature of around 700–800° F. The construction of the furnace and the portion of the heat pipe therein are more fully shown and described in application 663,342, mentioned above.

Figure 9:
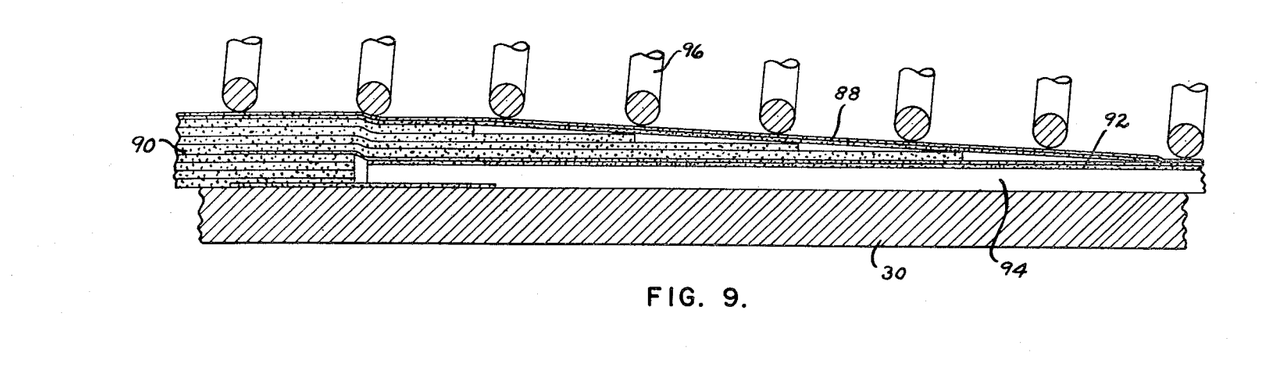
FIGS. 9 and 10 are enlarged sectional views of the evaporator and condenser portions of the heat pipe shown in FIG. 5.
Figure 10:
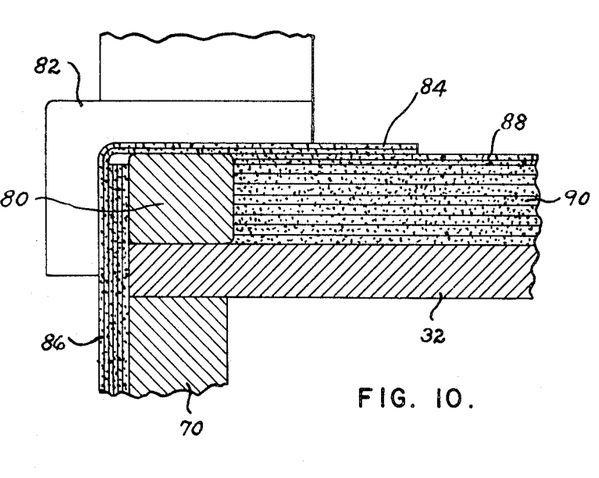

Referring to FIGS. 3 to 6, 9 and 10, heat pipe 28 may have an inside diameter of about three inches, and it is welded to a reservoir 70 in the form of a transverse stainless steel pipe located beyond the furnace and extending across one end of the car. The heat pipe is closed by an end cap 72. Reservoir 70 has a nipple 73 through which it is charged with liquid and an inert gas, such as argon, and has a safety head 74, including a rupture disc, for relieving excessive pressure. The far end of the heat pipe has a welded end cap 76 provided with a stainless steel fiber plug 78, for providing capillary action and insulation at the end. As shown in FIG. 10, pipe section 32 is joined to reservoir 70, and the construction in the area marked 10 on FIG. 5 includes a ring 80 of nickel coated copper, sintered fiber porous material, or other felted porous metal, held by a snap ring 82, and two layers of rolled or pressed fine mesh stainless steel wire screen 84 folded along the wall of the reservoir as indicated at 86. Beneath screens 84 there are a pair of layers of similar screen 88, and between screens 80 and the wall of pipe section 32 are eight layers of screen 90 of coarser mesh, forming a layer about a quarter of an inch thick. These several screens constitute the wick at the evaporator end of the heat pipe.

Figure 5:
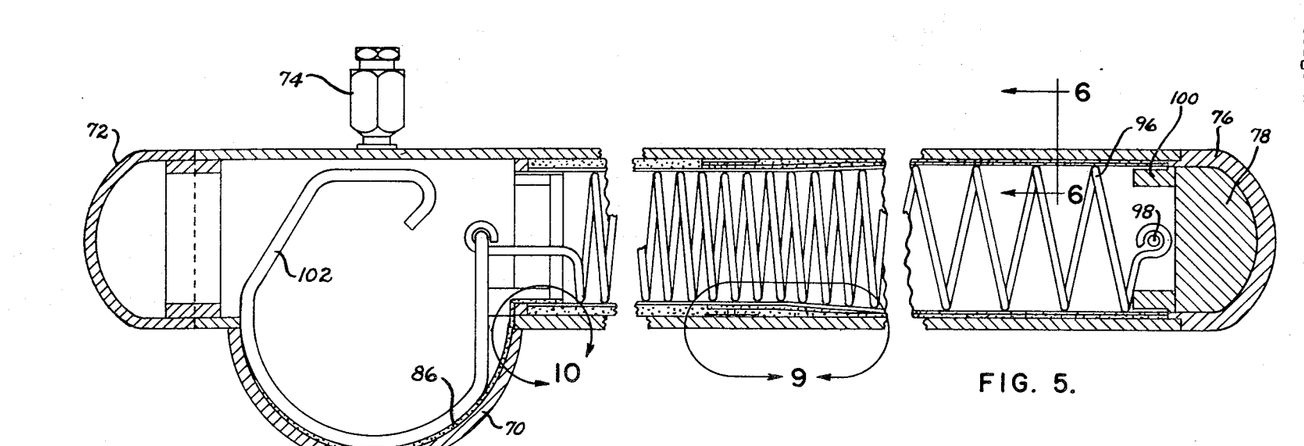
FIG. 5 is a sectional view taken along line 5—5 of FIG. 4.

FIG. 9 shows the construction of the wick in the region marked 9 in FIG. 5. Wire screens 88 form the two top layers of the wick. The eight coarse layers of screen 90 are reduced to four layers, which are feathered out as shown, leaving eventually two layers of screen 88, 92 separated from the wall of pipe 30 by a corrugated screen 94, beat shown in FIG. 6. This wick structure extends out to the end of the pipe. The wick is held in place by coil spring 96, which is anchored to pin 98 on ring 100 at one end, and anchored to spring clip 102 at the other end. Corrugated screen 94 provides large pores for longitudinal flow, while at the same time maintaining some wicking action, which is primarily provided by surface layers 88, 92.

Figure 6:
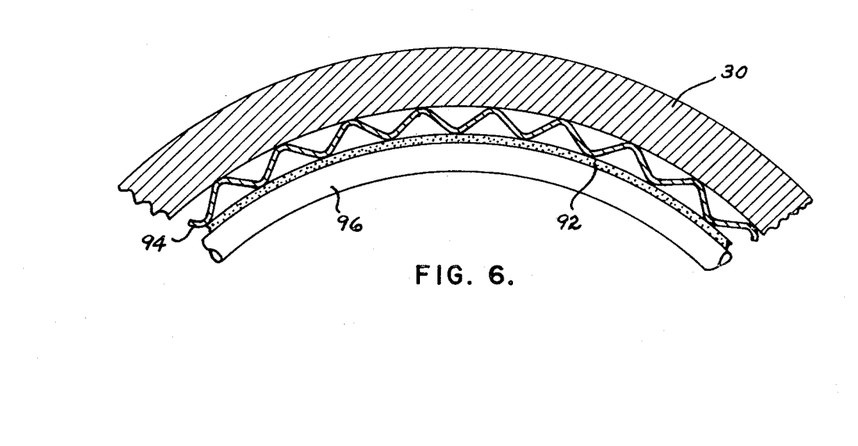
FIG. 6 is a partial sectional view along line 6—6 of FIG. 5.
Figure 7:
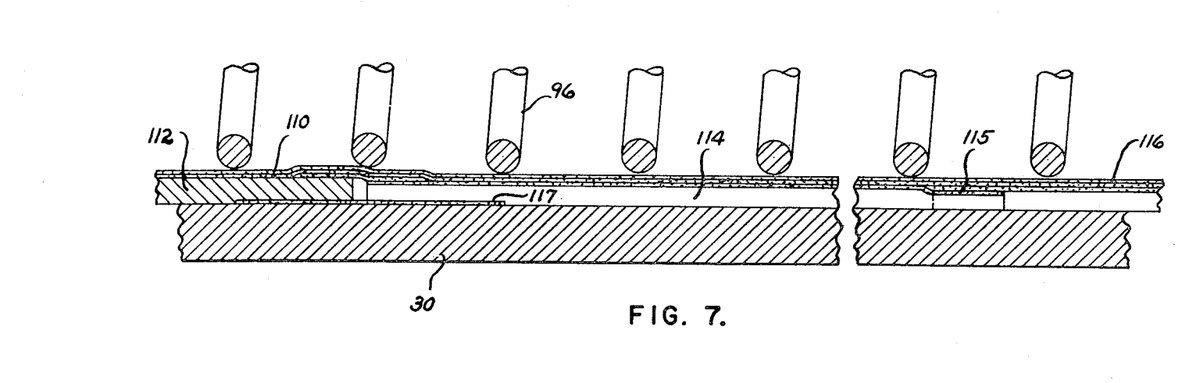
FIGS. 7 and 8 are sectional views of portions of another embodiment of the heat pipe.
Figure 8:
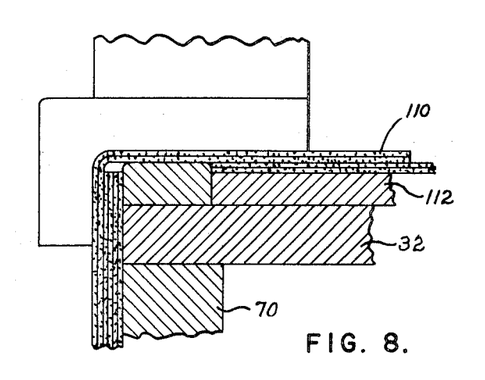

FIGS. 7 and 8 show a variation of the wick structure. At the evaporator end, as shown in FIG. 8, the construction is similar to that of FIG. 10, except that beneath the four layers of screen 110, which may have a 50 to 250 mesh, there is a layer 112 of felted metal about one tenth inch thick, extending throughout the evaporator section of the heat pipe. In the condenser section the layer 112 is replaced by a corrugated screen 114, which may be similar to that shown in FIG. 6, holding several layers of fine mesh screen 116 spaced from the wall of the heat pipe. The coil spring 96 for holding the wick against the wall of the pipe may be the same as coil spring 96 of FIG. 5. Adjacent screens are overlapped as indicated at 115. To prevent shifting of corrugated screen 114 relative to the porous metal sheet 112, they are both welded to wire screen 117.

Figure 11:
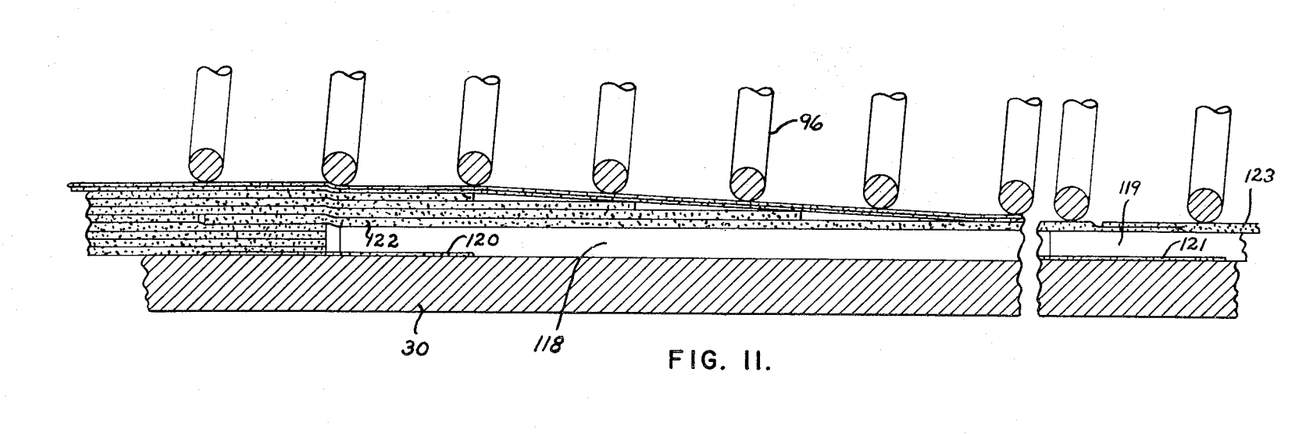
FIGS. 11 and 12 are partial sectional views of another variation of the heat pipe.
Figures 12, 13, 14:
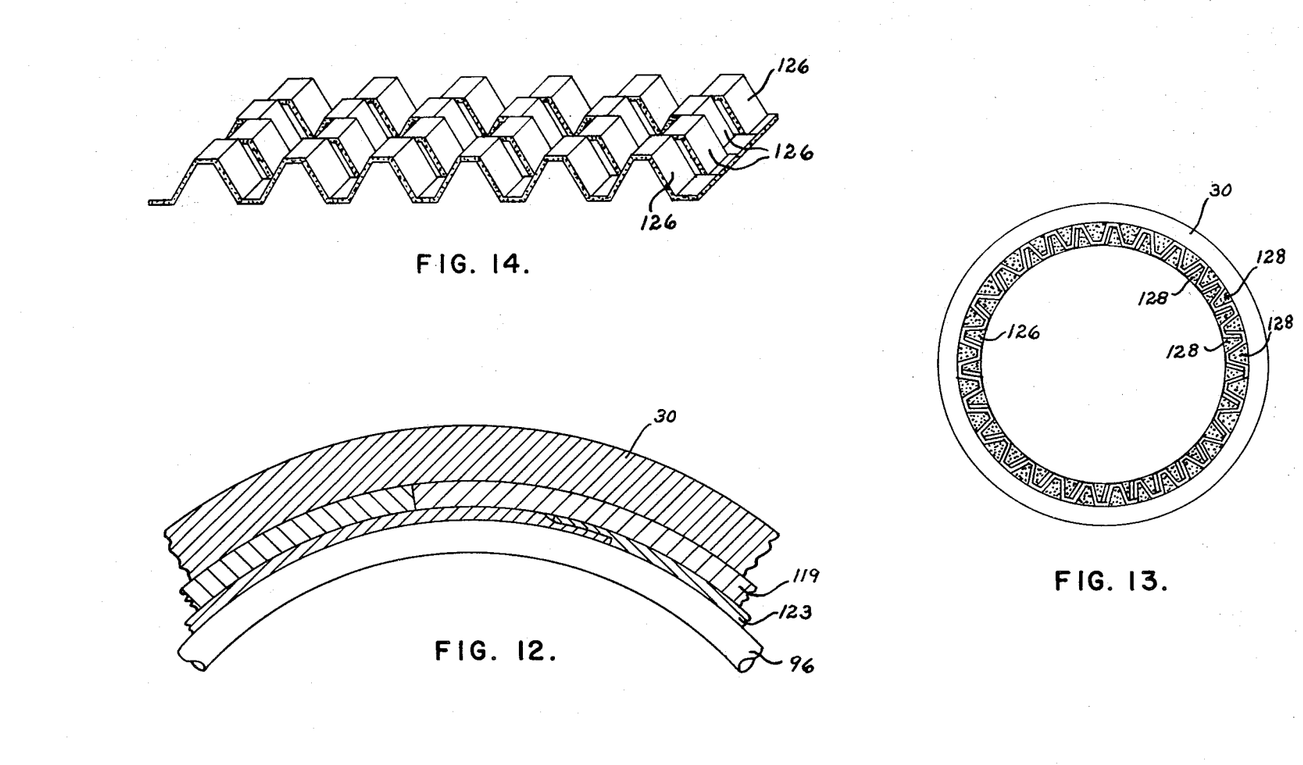
FIGS. 13 and 14 show another modification of the condenser section of the heat pipe.

FIGS. 11 and 12 show a wick which, in the evaporator portion, may be the same as that of FIGS. 5 and 10, including coarse screens 90 and fine mesh screens 88. Along the condenser portion, however, the corrugated screen shown in FIG. 6 is replaced by wire rings 118, 119 of felted metal. The rings 118, 119 are held in place by welding to wire screen rings 120, 121. A thin layer of felted metal, including rings 122, 123, are placed on layer 118, 119 and held in place by coil spring 96. The layers 118, 119, 122 and 123 are more easily fabricated than wire mesh layers and may be obtained in cylindrical form. Layer 122, 123 is of fine porosity to provide wicking action primarily, and layer 118, 119 is of large porosity to provide longitudinal flow paths for the liquid.

Another construction of the wick which may be employed in either the condenser section 30 or the outer end heat section 32 of the heat pipe is shown in FIGS. 13 and 14. Corrugated sheet metal strips 126 are placed contiguously to one another, or connected together at their edges. Matted steel fibers 128 are packed within the corrugations on both sides of strips 126, and the structure, formed into a cylindrical section, is sintered. The sintered fibers provide a highly desirable wicking characteristic when placed on the wall of the condenser section 30 of the heat pipe, as shown in FIG. 13, while the metal strips 126 provide a very effective heat transfer across the wick. As seen in FIG. 14, strips 126 are offset or staggered from one another to provide a tortuous flow passage in a longitudinal direction, as well as an annular direction about the circumference of the pipe. Thus the liquid will be wicked from the bottom of the pipe to the upper portion thereof through the sintered fiber material having sheet metal corrugations therein.

The operation of the apparatus will be understood by those skilled in the art, for the principles of the heat pipe have been described in the literature and patents. Briefly, in the evaporator or boiler section 32 of heat pipe 28, furnace 22 supplies heat to vaporize the liquid, which may be water. The vapor moves through the central part of the heat pipe. The lading in the tank car 10 removes heat from the wall of heat pipe 28 and causes some of the vapor to condense along the portion 30 of the pipe. The condensate flows back through the heat pipe to evaporator section 32, aided by the capillary action of the wick. The great amount of heat energy in the vapor maintains the heat pipe temperature along the pipe with a very small gradient. When the heat pipe is not in operation, the water drains into the reservoir, where no damage is caused if the water freezes since the reservoir is never full of water. Other features and operational characteristics have been referred to above and will be understood by those skilled in the art.

We claim:

1. A heat pipe comprising an evaporating portion near one end of the heat pipe and a condensing portion extending to the other end of said heat pipe; heat producing means adjacent said evaporating portion to heat said evaporating portion for the transfer of heat therefrom to the condensing portion of the pipe, said heat pipe comprising an outer closed pipe casing inclined toward said one end thereof at a slope of at least two percent (2%); a porous wick positioned against the inner circumferential surface of the casing; a sufficient quantity of vaporizable fluid within the casing to wet the entire wick, said fluid being vaporized by said heat producing means and moving away from said heat producing means to said condensing portion, said vaporized fluid condensing along the length of the condensing portion by a capillary action of said wick; and a closed sump reservoir of a large cross-sectional area relative to that of said casing connected to the bottom of said one end portion of the heat pipe for draining off and storing the vaporizable fluid when said heat producing means is not in operation, said wick having a portion extending from said casing along a wall of the reservoir immediately subjacent the casing to the bottom of the reservoir, whereby the vaporizable fluid may be raised from said reservoir into said casing by a capillary action, said reservoir having sufficient capacity to prevent damage to said heat pipe due to freezing of the vaporizable fluid.

2. A heat pipe according to claim 1, wherein said reservoir is a cylinder transverse to and below said casing and intersecting the bottom of said casing.

3. A heat pipe according to claim 1, wherein said wick tapers from the evaporating portion to the condensing portion of the heat pipe.

References Cited

UNITED STATES PATENTS

| | | | |
|---|---|---|---|
| 3,528,494 | 9/1970 | Levedahl | 165—105 |
| 1,971,135 | 8/1934 | Derby | 165—105 X |
| 3,498,369 | 3/1970 | Levedahl | 165—105 |

FOREIGN PATENTS

| | | | |
|---|---|---|---|
| 771,878 | 8/1934 | France | 165—105 |

OTHER REFERENCES

Eastman, G. Y.: Heat Pipe, Scientific American, May 1968, pp. 38 and 46.

Deverall, J. E. et al.: High Thermal Conductance Devices, Los Alamos Scien. Lab. (LA-3211), April 1965, pp. 29 and 30.

ALBERT W. DAVIS, JR., Primary Examiner

U.S. Cl. X.R.

122—33; 126—376, 387; 165—134